(12) United States Patent
Harada

(10) Patent No.: US 11,173,749 B2
(45) Date of Patent: Nov. 16, 2021

(54) PNEUMATIC TIRE

(71) Applicant: The Yokohama Rubber Co., LTD., Tokyo (JP)

(72) Inventor: Shunya Harada, Hiratsuka (JP)

(73) Assignee: The Yokohama Rubber Co., LTD.

( * ) Notice: Subject to any disclaimer, the term of this patent is extended or adjusted under 35 U.S.C. 154(b) by 475 days.

(21) Appl. No.: 16/094,197

(22) PCT Filed: Feb. 22, 2017

(86) PCT No.: PCT/JP2017/006659
§ 371 (c)(1),
(2) Date: Oct. 16, 2018

(87) PCT Pub. No.: WO2017/187739
PCT Pub. Date: Nov. 2, 2017

(65) Prior Publication Data
US 2019/0135044 A1    May 9, 2019

(30) Foreign Application Priority Data
Apr. 28, 2016   (JP) ............................ JP2016-090914

(51) Int. Cl.
*B60C 11/01*    (2006.01)
*B60C 11/12*    (2006.01)
(Continued)

(52) U.S. Cl.
CPC .............. *B60C 11/12* (2013.01); *B60C 11/01* (2013.01); *B60C 11/03* (2013.01);
(Continued)

(58) Field of Classification Search
CPC . B60C 11/01; B60C 11/1236; B60C 11/1369; B60C 11/12; B60C 11/13; B60C 2011/0348
(Continued)

(56) References Cited

U.S. PATENT DOCUMENTS

D514,059 S  *  1/2006  Dixon ........................ D12/552
2007/0215258 A1  9/2007  Fukunaga
(Continued)

FOREIGN PATENT DOCUMENTS

EP    0609195   *  8/1994
EP    0722851   *  7/1996
(Continued)

OTHER PUBLICATIONS

International Search Report for International Application No. PCT/JP2017/006659 dated May 23 2017, 4 pages, Japan.

*Primary Examiner* — Robert C Dye
(74) *Attorney, Agent, or Firm* — Thorpe North & Western

(57) ABSTRACT

A pneumatic tire includes shoulder lug grooves and narrow grooves. The shoulder lug grooves are positioned outward in a width direction with respect outermost main grooves. The narrow grooves are positioned outward in the width direction with respect to the outermost main grooves, are formed in spaces between the shoulder lug grooves that are adjacent to each other in the tire circumferential direction, and have both ends connected to the shoulder lug grooves. The narrow grooves are formed across the ground contact edges. A relationship W≥(D1×0.8) is satisfied, where W indicates a distance between the ground contact surface inner end portions and the outermost main grooves in the tire width direction and D1 indicates a groove depth of the outermost main grooves.

10 Claims, 9 Drawing Sheets

(51) Int. Cl.
 *B60C 11/13* (2006.01)
 *B60C 11/03* (2006.01)

(52) U.S. Cl.
 CPC .......... *B60C 11/1236* (2013.01); *B60C 11/13* (2013.01); *B60C 11/1369* (2013.01)

(58) Field of Classification Search
 USPC .................................................... 152/209.27
 See application file for complete search history.

(56) References Cited

U.S. PATENT DOCUMENTS

| | | | |
|---|---|---|---|
| 2010/0139826 A1 | 6/2010 | Matsumoto | |
| 2010/0200134 A1* | 8/2010 | Murata | B60C 11/0309 152/209.9 |
| 2011/0048601 A1 | 3/2011 | Fukunaga | |
| 2012/0067486 A1* | 3/2012 | Yumii | B60C 17/0009 152/517 |
| 2013/0292018 A1 | 11/2013 | Murata | |
| 2015/0298508 A1 | 10/2015 | Yamakawa et al. | |

FOREIGN PATENT DOCUMENTS

| | | | |
|---|---|---|---|
| EP | 3124290 | * | 2/2017 |
| JP | 06-032117 | * | 2/1994 |
| JP | 2006-160195 | | 6/2006 |
| JP | 3970164 | | 9/2007 |
| JP | 2009-040156 | | 2/2009 |
| JP | 2010-132236 | | 6/2010 |
| JP | 2010-285152 | | 12/2010 |
| JP | 2012-091564 | | 5/2012 |
| JP | 2012-091734 | * | 5/2012 |
| JP | 2012-131265 | | 7/2012 |
| JP | 2016-055817 | | 4/2016 |
| WO | WO 2005/115770 | | 12/2005 |
| WO | WO 2009/020077 | | 2/2009 |
| WO | WO 2014/136500 | | 9/2014 |

* cited by examiner

|  |  | CONVENTIONAL EXAMPLE | COMPARATIVE EXAMPLE 1 | COMPARATIVE EXAMPLE 2 | EXAMPLE 1 | EXAMPLE 2 | EXAMPLE 3 |
|---|---|---|---|---|---|---|---|
| PRESENCE OR ABSENCE OF RAISED BOTTOM PORTION |  | ABSENT | PRESENT | PRESENT | PRESENT | PRESENT | PRESENT |
| PRESENCE OR ABSENCE OF NARROW GROOVE ACROSS GROUND CONTACT EDGE |  | ABSENT | ABSENT | PRESENT | PRESENT | PRESENT | PRESENT |
| GROOVE WIDTH OF NARROW GROOVE | mm | - | - | 2 | 2 | 2 | 2 |
| D1 | mm | 8 | 8 | 8 | 8 | 8 | 8 |
| D2 | mm | 6 | 4 | 4 | 3 | 0.8 | 7 |
| D3 | mm | 6 | 6 | 6 | 6 | 6 | 7.5 |
| S1 | mm | - | - | 3 | 3 | 0.8 | 7 |
| S2 | mm | - | - | 3 | 3 | 3 | 7.5 |
| W/D1 | RATIO | - | - | 0.7 | 0.8 | 0.8 | 0.8 |
| D2/D1 | RATIO | 0.8 | 0.5 | 0.5 | 0.4 | 0.1 | 0.9 |
| S1/D2 | RATIO | - | - | 0.8 | 1.0 | 1.0 | 1.0 |
| L1/L2 | RATIO | - | - | 1.0 | 1.0 | 1.0 | 1.0 |
| L1'/L2' | RATIO | - | - | 1.0 | 1.0 | 1.0 | 1.0 |
| θ1 | ° | - | - | 20 | 20 | 20 | 20 |
| θ2 | ° | - | - | 20 | 20 | 20 | 20 |
| PRESENCE OR ABSENCE OF DIVIDED NARROW GROOVE |  | ABSENT | ABSENT | ABSENT | ABSENT | ABSENT | ABSENT |
| WET PERFORMANCE | INDEX VALUE | 100 | 98 | 103 | 102 | 101 | 105 |
| STEERING STABILITY | INDEX VALUE | 100 | 105 | 101 | 103 | 104 | 101 |

FIG. 9A

|  |  | EXAMPLE 4 | EXAMPLE 5 | EXAMPLE 6 | EXAMPLE 7 | EXAMPLE 8 | EXAMPLE 9 |
|---|---|---|---|---|---|---|---|
| PRESENCE OR ABSENCE OF RAISED BOTTOM PORTION |  | PRESENT | PRESENT | PRESENT | PRESENT | PRESENT | PRESENT |
| PRESENCE OR ABSENCE OF NARROW GROOVE ACROSS GROUND CONTACT EDGE |  | PRESENT | PRESENT | PRESENT | PRESENT | PRESENT | PRESENT |
| GROOVE WIDTH OF NARROW GROOVE | mm | 2 | 2 | 2 | 2 | 2 | 2 |
| D1 | mm | 8 | 8 | 8 | 8 | 8 | 8 |
| D2 | mm | 2 | 5 | 5 | 3 | 3 | 3 |
| D3 | mm | 6 | 6 | 6 | 6 | 6 | 6 |
| S1 | mm | 2 | 5 | 0.5 | 3 | 3 | 3 |
| S2 | mm | 2 | 5 | 5 | 5 | 5 | 5 |
| W/D1 | RATIO | 0.8 | 0.8 | 0.8 | 0.8 | 0.8 | 0.8 |
| D2/D1 | RATIO | 0.3 | 0.6 | 0.6 | 0.4 | 0.4 | 0.4 |
| S1/D2 | RATIO | 1.0 | 1.0 | 0.1 | 1.0 | 1.0 | 1.0 |
| L1/L2 | RATIO | 1.0 | 1.0 | 1.0 | 1.0 | 0.9 | 2.1 |
| L1'/L2' | RATIO | 1.0 | 1.0 | 1.0 | 1.0 | 1.0 | 1.0 |
| θ1 | ° | 20 | 20 | 20 | 20 | 20 | 20 |
| θ2 | ° | 20 | 20 | 20 | 20 | 20 | 20 |
| PRESENCE OR ABSENCE OF DIVIDED NARROW GROOVE |  | ABSENT | ABSENT | ABSENT | ABSENT | ABSENT | ABSENT |
| WET PERFORMANCE | INDEX VALUE | 100 | 104 | 102 | 103 | 102 | 103 |
| STEERING STABILITY | INDEX VALUE | 104 | 101 | 101 | 103 | 104 | 102 |

FIG. 9B

|  |  | EXAMPLE 10 | EXAMPLE 11 | EXAMPLE 12 | EXAMPLE 13 | EXAMPLE 14 | EXAMPLE 15 |
|---|---|---|---|---|---|---|---|
| PRESENCE OR ABSENCE OF RAISED BOTTOM PORTION |  | PRESENT | PRESENT | PRESENT | PRESENT | PRESENT | PRESENT |
| PRESENCE OR ABSENCE OF NARROW GROOVE ACROSS GROUND CONTACT EDGE |  | PRESENT | PRESENT | PRESENT | PRESENT | PRESENT | PRESENT |
| GROOVE WIDTH OF NARROW GROOVE | mm | 2 | 2 | 2 | 2 | 2 | 2 |
| D1 | mm | 8 | 8 | 8 | 8 | 8 | 8 |
| D2 | mm | 3 | 3 | 3 | 3 | 3 | 3 |
| D3 | mm | 6 | 6 | 6 | 6 | 6 | 6 |
| S1 | mm | 3 | 3 | 3 | 3 | 3 | 3 |
| S2 | mm | 5 | 5 | 5 | 5 | 5 | 5 |
| W/D1 | RATIO | 0.8 | 0.8 | 0.8 | 0.8 | 0.8 | 0.8 |
| D2/D1 | RATIO | 0.4 | 0.4 | 0.4 | 0.4 | 0.4 | 0.4 |
| S1/D2 | RATIO | 1.0 | 1.0 | 0.1 | 1.0 | 1.0 | 1.0 |
| L1/L2 | RATIO | 1.3 | 1.3 | 1.3 | 1.3 | 1.3 | 1.3 |
| L1'/L2' | RATIO | 1.0 | 0.9 | 2.1 | 1.3 | 1.3 | 1.3 |
| $\theta 1$ | ° | 20 | 20 | 20 | 20 | 30 | 30 |
| $\theta 2$ | ° | 20 | 20 | 20 | 20 | 20 | 20 |
| PRESENCE OR ABSENCE OF DIVIDED NARROW GROOVE |  | ABSENT | ABSENT | ABSENT | ABSENT | ABSENT | ABSENT |
| WET PERFORMANCE | INDEX VALUE | 104 | 103 | 105 | 105 | 106 | 107 |
| STEERING STABILITY | INDEX VALUE | 103 | 104 | 102 | 103 | 103 | 104 |

FIG. 9C

PNEUMATIC TIRE

TECHNICAL FIELD

The present technology relates to a pneumatic tire.

BACKGROUND ART

In a pneumatic tire, a plurality of grooves are formed in a tread surface for the purpose of water drainage between the tread surface and a road surface during traveling on a wet road surface. On the tread surface, these grooves define a plurality of land portions. Further, the land portions where the grooves are formed have lower rigidity, and hence uneven wear resistance is degraded. Thus, some of the related-art tires secure the rigidity of the land portions by forming raised bottom portions in the grooves. However, when the raised bottom portions are formed in the grooves, a stress generated by the twisted land portions during braking/driving or turning is concentrated on the raised bottom portions. As a result, a crack is liable to be formed. For this reason, some of the related-art pneumatic tires suppress the stress concentration on the raised bottom portions. For example, in a pneumatic tire described in Japan Patent No. 3970164, a plurality of sipes are formed at positions where the raised bottom portions of the grooves are formed in block portions. In this manner, the stress concentration on the raised bottom portions is alleviated to suppress the crack formation.

When the raised bottom portions are formed in the grooves, the rigidity of the block portions can be improved. However, the grooves are required to have drainage properties. In consideration of the drainage properties, significant bottom raising is difficult. For example, shoulder blocks, i.e., block portions arranged in regions at or near the shoulder portions greatly contribute to steering stability. Thus, in order to improve the steering stability, it is effective to form the raised bottom portions in lug grooves defining the shoulder blocks. However, when the raised bottom portions are formed in the lug grooves defining the shoulder blocks, the drainage properties are degraded. In consideration of wet performance, significant bottom raising is difficult. As described above, it is extremely difficult to provide the steering stability and the wet performance in a compatible manner while securing the block rigidity required for the shoulder regions and securing the drainage properties.

SUMMARY

The present technology provides a pneumatic tire that can provide steering stability and wet performance in a compatible manner.

An embodiment of the present technology is a pneumatic tire including a plurality of main grooves, a plurality of shoulder lug grooves, and narrow grooves. The plurality of main grooves are formed in a tread surface and extend in a tire circumferential direction. The plurality of shoulder lug grooves are positioned outward in a tire width direction with respect to outermost main grooves of the plurality of main grooves in the tire width direction, are formed to extend in the tire width direction across ground contact edges, and have inner end portions in the tire width direction connected to the outermost main grooves. The narrow grooves are positioned outward in the tire width direction with respect to the outermost main grooves, are formed in spaces between the plurality of shoulder lug grooves that are adjacent to each other in the tire circumferential direction, and have both ends connected to the plurality of shoulder lug grooves. The plurality of shoulder lug grooves include raised bottom portions, which are formed by reducing a groove depth in areas between end portions on sides connected to the outermost main grooves and the ground contact edges. The narrow grooves have one ends positioned inward in the tire width direction with respect to the ground contact edges and other ends positioned outward in the tire width direction with respect to the ground contact edges, and are formed across the ground contact edges. Ground contact surface inner end portions, which are end portions positioned inward in the tire width direction with respect to the ground contact edges, are connected to positions where the raised bottom portions are formed in the plurality of shoulder lug grooves. Ground contact surface outer end portions, which are end portions positioned outward in the tire width direction with respect to the ground contact edges, are connected to positions where the raised bottom portions are not formed in the plurality of shoulder lug grooves. A relationship $W \geq (D1 \times 0.8)$ is satisfied, where W indicates a distance between the ground contact surface inner end portions and the outermost main grooves in the tire width direction and D1 indicates a groove depth of the outermost main grooves.

Further, in the above-mentioned pneumatic tire, it is preferred that, in the plurality of shoulder lug grooves, a relationship $(D1 \times 0.2) \leq D2 \leq (D1 \times 0.8)$, a relationship $D2 < D3$, and a relationship $D3 < D1$ be satisfied, where D2 indicates a groove depth at the positions where the raised bottom portions are formed, D3 indicates a groove depth at the positions where the raised bottom portions are not formed, and D1 indicates the groove depth of the outermost main grooves.

Further, in the above-mentioned pneumatic tire, it is preferred that, in the narrow grooves, a relationship $(D2 \times 0.2) \leq S1 \leq D2$ and a relationship $D2 \leq S2 \leq D3$ be satisfied, where S1 indicates a groove depth of the ground contact surface inner end portions, S2 indicates a groove depth of the ground contact surface outer end portions, D2 indicates the groove depth of the positions where the raised bottom portions are formed in the plurality of shoulder lug grooves, and D3 indicates a groove depth at the positions where the raised bottom portions are not formed.

Further, in the above-mentioned pneumatic tire, it is preferred that, in the narrow grooves, a relationship $L1 \geq L2$ and a relationship $1 \leq (L1/L2) \leq 2$ be satisfied, where L1 indicates a distance between intersection portions at which the narrow grooves and the ground contact edges intersect with each other and the ground contact surface inner end portions in the tire circumferential direction and L2 indicates a distance between the intersection portions and the ground contact surface outer end portions in the tire circumferential direction.

Further, in the above-mentioned pneumatic tire, it is preferred that, in the narrow grooves, a relationship $L1' \geq L2'$ and a relationship $1 \leq (L1'/L2') \leq 2$ be satisfied, where L1' indicates a distance between the ground contact edges and the ground contact surface inner end portions in the tire width direction and L2' indicates a distance between the ground contact edges and the ground contact surface outer end portions in the tire width direction.

Further, in the above-mentioned pneumatic tire, it is preferred that, in the narrow grooves, a relationship $10° \leq \theta1 \leq 45°$, a relationship $10° \leq \theta2 \leq 45°$, and a relationship $0.8 \leq (\theta1/\theta2) \leq 2.0$ be satisfied, where $\theta1$ indicates an angle formed between straight lines connecting the intersection portions at which the narrow grooves and the ground contact edges intersect with each other and the ground contact surface inner end portions and θ2 indicates an angle formed by straight lines connecting the intersection portions and the ground contact surface outer end portions and the ground contact edges.

The pneumatic tire according to an embodiment of the present technology can achieve the effect of providing the steering stability and the wet performance in a compatible manner.

BRIEF DESCRIPTION OF DRAWINGS

FIG. 9A is a table showing results of performance tests of pneumatic tires.

FIG. 9B is a table showing results of performance tests of pneumatic tires.

FIG. 9C is a table showing results of performance tests of pneumatic tires.

DETAILED DESCRIPTION

Now, with reference to the drawings, description is made of a pneumatic tire according to an embodiment of the present technology. Note that, the technology is not limited to the embodiment. Further, constituents in the embodiment described below include elements that can be substituted or easily conceived by a person skilled in the art or that are essentially identical.

In the following description, "tire width direction" refers to the direction that is parallel with a rotation axis of the pneumatic tire. "Inward in the tire width direction" refers to the direction toward the tire center line in the tire width direction. "Outward in the tire width direction" refers to the direction opposite the direction toward the tire center line in the tire width direction. "Tire radial direction" refers to the direction orthogonal to the rotation axis. "Tire circumferential direction" refers to the rotation direction about the rotation axis as the center.

Figure 1:
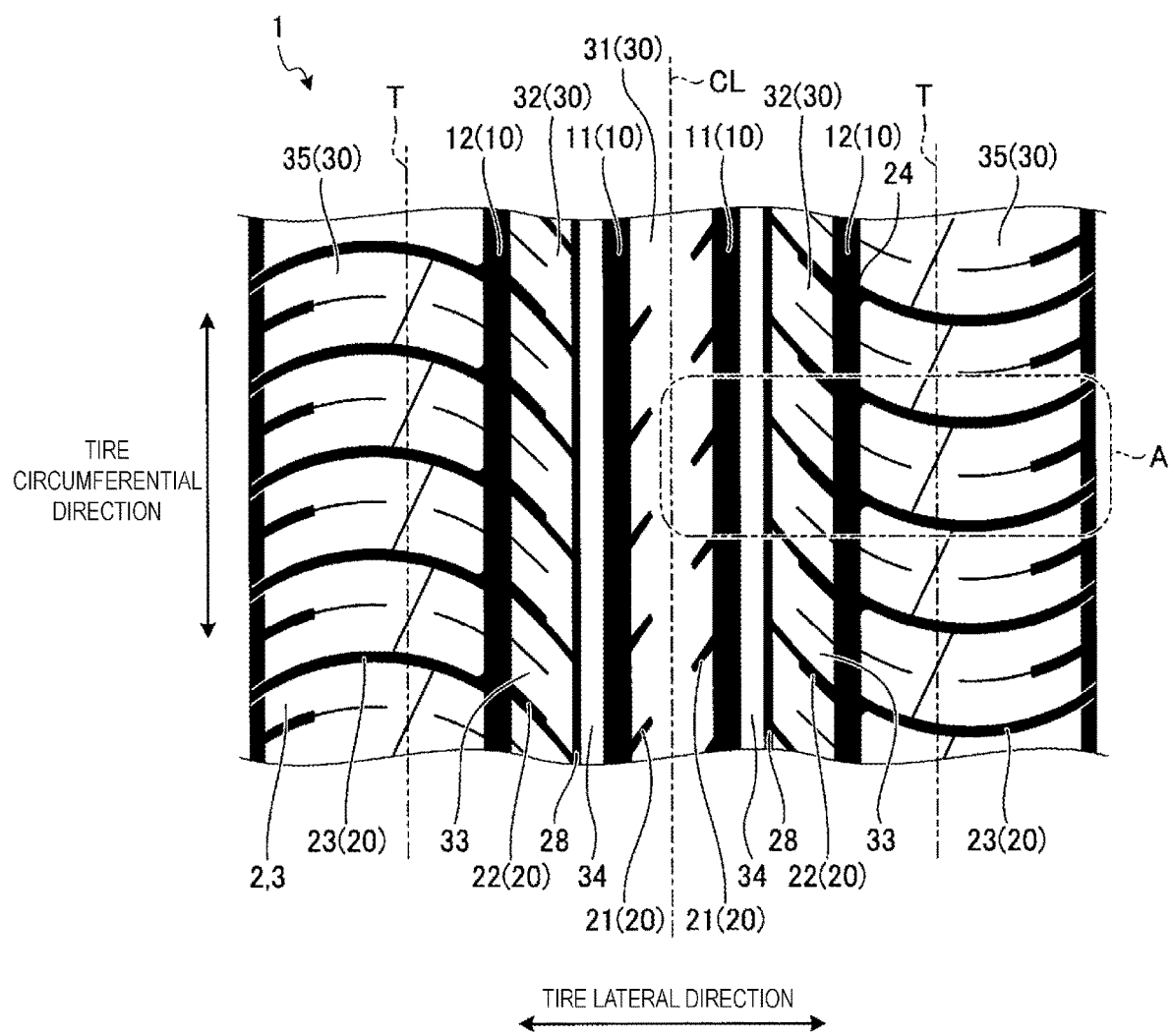
FIG. 1 is a plan view for illustrating a tread surface of a pneumatic tire according to an embodiment of the present technology.

FIG. 1 is a plan view for illustrating a tread surface of the pneumatic tire according to the embodiment. In the pneumatic tire 1 illustrated in FIG. 1, a tread portion 2 is arranged in the outermost portion in the tire radial direction. A surface of the tread portion 2, that is, a portion that comes into contact with a road surface when a vehicle (not illustrated) mounted with the pneumatic tire 1 travels, is formed as a tread surface 3. In the tread surface 3, a plurality of main grooves 10 and a plurality of lug grooves 20 are formed. The main grooves 10 are provided on both sides of the tire width direction with respect to the tire center line CL as the center, and extend in the tire circumferential direction. The lug grooves 20 extend in the tire width direction. The main grooves 10 and the lug grooves 20 define a plurality of land portions 30.

In the present embodiment, the four main grooves 10 are formed side by side in the tire width direction at intervals. That is, two of the main grooves 10 are formed on either side of the tire center line CL in the tire width direction. Each of the main grooves 10 has a groove width falling within a range from 3 mm to 12 mm and a groove depth falling within a range from 5 mm to 10 mm.

The two main grooves 10 of the four main grooves 10, which are positioned on the outermost sides in the tire width direction, are provided as outermost main grooves 12. The other two main grooves 10, which are positioned inward in the tire width direction with respect to the outermost main grooves 12 and are adjacent to the outermost main grooves 12, are provided as inner side main grooves 11. In other words, the other two main grooves 10 of the four main grooves 10, which are positioned on both sides of the tire center line CL in the tire width direction, are provided as the inner side main grooves 11. The two main grooves 10, which are positioned outward in the tire width direction with respect to the two inner side main grooves 11, are provided as the outermost main grooves 12.

The lug grooves 20 includes center lug grooves 21, second lug grooves 22, and shoulder lug grooves 23. The center lug grooves 21 are positioned between the two inner side main grooves 11. The second lug grooves 22 are positioned between the inner side main grooves 11 and the outermost main grooves 12 that are adjacent to each other. The shoulder lug grooves 23 are positioned outward in the tire width direction with respect to the outermost main grooves 12.

Further, the land portion 30 of the plurality of land portions 30, which has both sides in the tire width direction defined by the inner side main grooves and is positioned on the tire equatorial line CL, is formed as a center rib 31. The center lug grooves 21 are not formed in an entire space between the two inner side main grooves 11. One end of each of the center lug grooves is connected to the inner side main groove 11, and another end thereof is terminated in the center rib 31. That is, as for the center lug grooves 21, the plurality of center lug grooves 21 are connected to each of the two inner side main grooves 11. Each of the center lug grooves 21 extends in the tire width direction, and is inclined to the tire circumferential direction.

Further, the land portions 30 of the plurality of land portions 30, which are positioned outward in the tire width direction with respect to the center rib 31, are adjacent to the center rib 31 through the inner side main grooves 11, and have both ends in the tire width direction defined by the inner side main grooves 11 and the outermost main grooves 12, are formed as second rib 32. Second rib circumferential grooves 28 are formed in the second ribs 32. The second rib circumferential grooves 28 are positioned between the inner side main grooves 11 and the outermost main grooves 12, and extend in the tire circumferential direction.

The second lug grooves 22 are formed in a space between the second rib circumferential grooves 28 and the outermost main grooves 12. The plurality of second lug grooves 22 are arranged side by side in the tire circumferential direction. That is, one end of each of the second lug grooves 22 is connected to the second rib circumferential groove 28, and another end thereof is connected to the outermost main groove 12. Thus, in regions of the second ribs 32 where the second lug grooves 22 are arranged, the second lug grooves 22 and block portions 33 are formed. The second lug grooves 22 are adjacent to one another in the tire circumferential direction. The block portions 33 are defined by the second rib circumferential grooves 28 and the outermost main grooves 12. The plurality of block portions 33 are arranged side by side in the tire circumferential direction. Meanwhile, regions in the second ribs 32, which are between the second rib circumferential grooves 28 and the inner side main grooves 11, correspond to rib portions 34 extending in the tire circumferential direction.

Further, the land portions 30 of the plurality of land portions 30, which are positioned outward in the tire width direction with respect to the second ribs 32, are adjacent to the second ribs 32 through the outermost main grooves 12, and are defined by the outermost main grooves 12 and the shoulder lug grooves 23 adjacent to each other in the tire circumferential direction, are formed as shoulder blocks 35. That is, on the outer sides of the outermost main grooves 12 in the tire width direction, the plurality of shoulder lug grooves 23 are formed side by side in the tire circumferential direction. The both sides of the shoulder blocks 35 in the tire circumferential direction are defined by the shoulder lug grooves 23 so that the plurality of shoulder blocks 35 are formed side by side in the tire circumferential direction. As described above, the shoulder lug grooves 23 defining the shoulder blocks 35 are formed to extend in the tire width direction across ground contact edges T, and end portions 24 on inner sides in the tire width direction are connected to the outermost main grooves 12. Further, each of the shoulder lug grooves 23 extends in the tire width direction, and is curved to project in the tire circumferential direction.

The ground contact edges T in this case indicate positions on the tread surface 3, which correspond to portions positioned outermost in the tire width direction on a contact surface formed when the pneumatic tire 1 is mounted on a specified rim and vertically loaded on a flat plane under an internal condition of a specified internal pressure, for example, an air pressure corresponding to a specified load and under the specified load condition. That is, the ground contact edges T are at the ground contact width maximum positions of the ground contact surface with the specified internal pressure and the specified load.

Note that "specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "NFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO.

Figure 2:
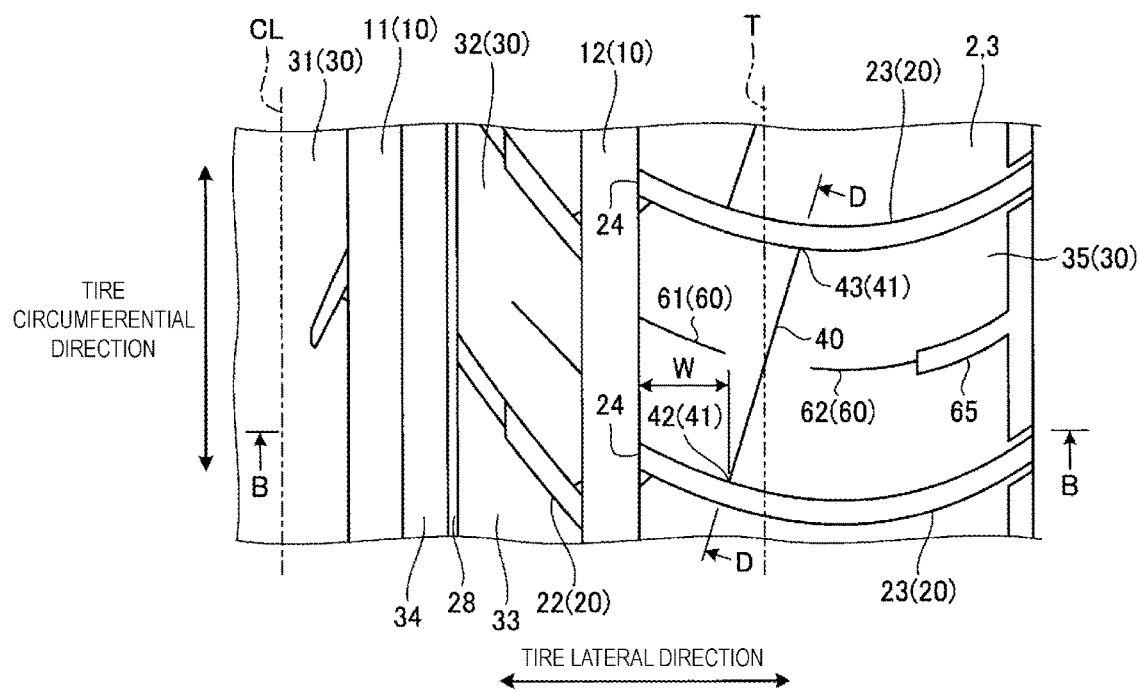
FIG. 2 is a detailed view of the portion A of FIG. 1.

FIG. 2 is a detailed view of the portion A of FIG. 1. A narrow groove 40 is formed between the shoulder lug grooves 23 that are adjacent to each other in the tire circumferential direction. The narrow groove 40 is positioned outward in the tire width direction with respect to the outermost main grooves 12, and is formed in a space between the shoulder lug grooves 23. Both ends of the narrow groove 40 are connected to the shoulder lug grooves 23. The narrow groove 40 has one end portion 41 positioned inward in the tire width direction with respect to the ground contact edge T and another end portion 41 positioned outward in the tire width direction with respect to the ground contact edge T. Thus, the narrow groove 40 is formed across the ground contact edge T. The narrow groove 40 in this case indicates a groove having a groove width of 3 mm or smaller, and includes a so-called sipe in which groove walls come into contact with each other when a load acts on the land portion 30 having the narrow groove 40 formed therein.

Figure 3:
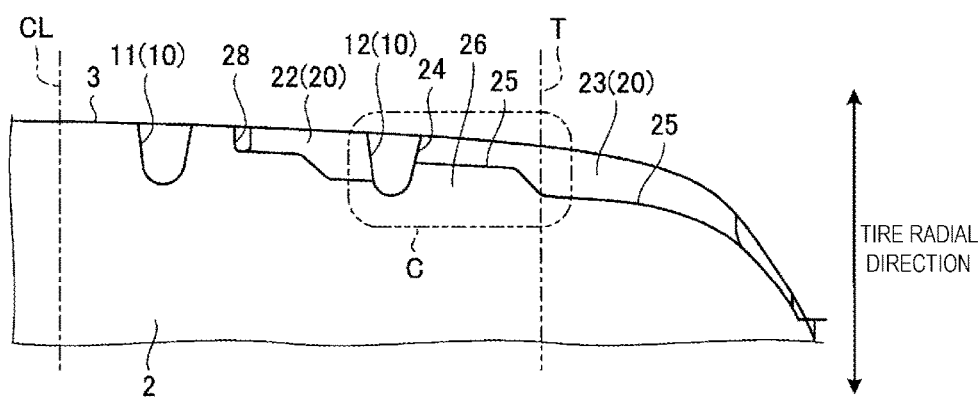
FIG. 3 is a cross-sectional view taken along the line B-B of FIG. 2.

FIG. 3 is a cross-sectional view taken along the line B-B of FIG. 2. Note that, FIG. 3 is a schematic diagram of a cross section taken along the second lug groove 22 and the shoulder lug groove 23 for illustrating the shoulder lug grooves 23 illustrated in FIG. 2. The shoulder lug groove 23 includes a raised bottom portion 26 formed by reducing the groove depth in an area between the end portion 24 on the side connected to the outermost main groove 12 and the ground contact edge T. As compared to a portion other than the raised bottom portion 26 in the shoulder lug groove 23, the raised bottom portion 26 is a portion having a small groove depth because an opening portion becomes close to a groove bottom 25. The raised bottom portion 26 is provided from the position of the end portion 24 on the side connected to the outermost main groove 12 to the position of the ground contact edge T in the shoulder lug groove 23. Note that, an end portion of the raised bottom portion 26 on the ground contact edge T side is not required to accurately match with the position of the ground contact edge T. The end portion of the raised bottom portion 26 may be positioned at a position closer to the outermost main groove 12 with respect to the ground contact edge T. The raised bottom portion 26 may be formed across the ground contact edge T.

Figure 4:
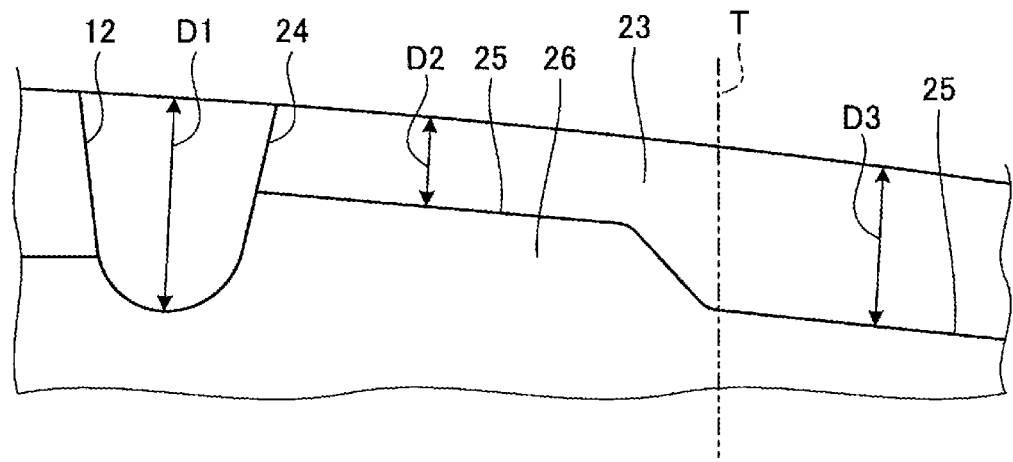
FIG. 4 is a detailed view of the portion C of FIG. 3.

FIG. 4 is a detailed view of the portion C of FIG. 3. The relationships $(D1 \times 0.2) \leq D2 \leq (D1 \times 0.8)$, $D2 < D3$, and $D3 < D1$ are satisfied, where $D2$ is a groove depth of the shoulder lug groove 23 having the raised bottom portion 26 at a position where the raised bottom portion 26 is formed, $D3$ is a groove depth at a position where the raised bottom portion 26 is not formed, and $D1$ is a groove depth of the outermost main groove 12. That is, in the shoulder lug groove 23, the groove depth $D2$ at the position where the raised bottom portion 26 is formed is less than the groove depth $D3$ at the position where the raised bottom portion 26 is not formed. The groove depth $D3$ at the position where the raised bottom portion 26 is not formed in the shoulder lug groove 23 is smaller than the groove depth $D1$ of the outermost main groove 12. Further, the groove depth $D2$ at the position where the raised bottom portion 26 is formed in the shoulder lug groove 23 falls within a range from 0.2 times to 0.8 times of the groove depth $D1$ of the outermost main groove 12.

Note that, in the present embodiment, the shoulder lug groove 23 has a groove width falling within a range from 2 mm to 8 mm. The groove depth $D2$ at the position where the raised bottom portion 26 is formed falls within a range from 1 mm to 4 mm, and the groove depth $D3$ at the position where the raised bottom portion 26 is not formed falls within a range from 2 mm to 8 mm.

In the narrow groove 40, a ground contact surface inner end portion 42 (see FIG. 2) which is the end portion 41 out of the end portions 41 which is positioned inward in the tire width direction with respect to the ground contact edge T, is connected to a position where the raised bottom portion 26 is formed in the shoulder lug groove 23. Further, a ground contact surface outer end portion 43 (see FIG. 2) which is the end portion 41 out of the end portions 41 of the narrow groove 40 which is positioned outward in the tire width direction with respect to the ground contact edge T, is connected to a position where the raised bottom portion 26 is not formed in the shoulder lug groove 23.

A distance W and the groove depth D1 of the outermost main groove 12 satisfy the relationship W≥(D1×0.8). The distance W is a distance between the ground contact surface inner end portion 42, which is connected to the position where the raise bottom portion 26 is formed in the shoulder lug groove 23, and the outermost main groove 12 in the tire width direction. That is, the ground contact surface inner end portion 42 of the narrow groove 40 is positioned at the position where the distance W to the outermost main groove 12 in the tire width direction is 0.8 times or larger than the groove depth D1 of the outermost main groove 12.

Figure 5:
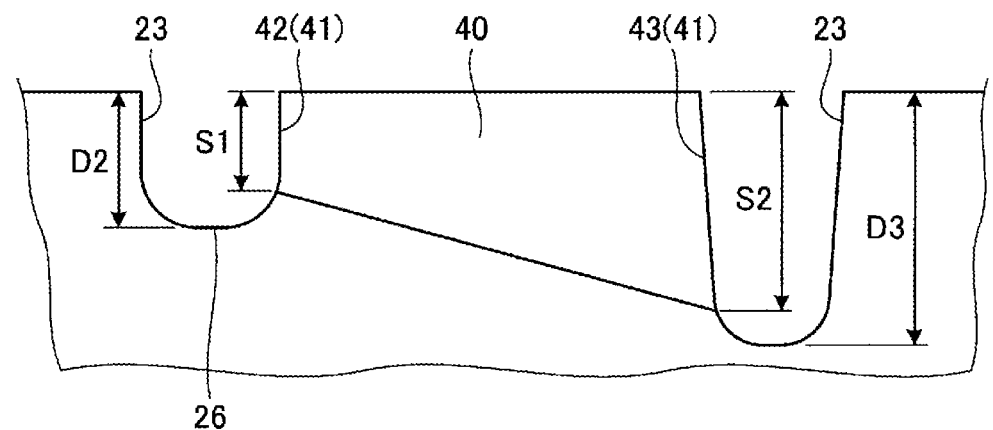
FIG. 5 is a cross-sectional view taken along the line D-D of FIG. 2.

FIG. 5 is a cross-sectional view taken along the line D-D of FIG. 2. In the narrow groove 40, the groove depth at the position of the ground contact surface outer end portion 43 is larger than the groove depth at the position of the ground contact surface inner end portion 42. The relationships (D2×0.2)≤S1≤D2 and D2≤S2≤D3 are satisfied, where S1 is a groove depth of the ground contact surface inner end portion 42 and S2 is a groove depth of the ground contact surface outer end portion 43. That is, the groove depth S1 of the ground contact surface inner end portion 42 of the narrow groove 40 falls within a range from 0.8 to 1 times the groove depth D2 at the position where the raised bottom portion 26 is formed in the shoulder lug groove 23. Further, the groove depth S2 of the ground contact surface outer end portion 43 of the narrow groove 40 falls within a range from the groove depth D2 at the position where the raised bottom portion 26 is formed in the shoulder lug groove 23 to the groove depth D3 at the position where the raised bottom portion 26 is not formed.

Figure 6:
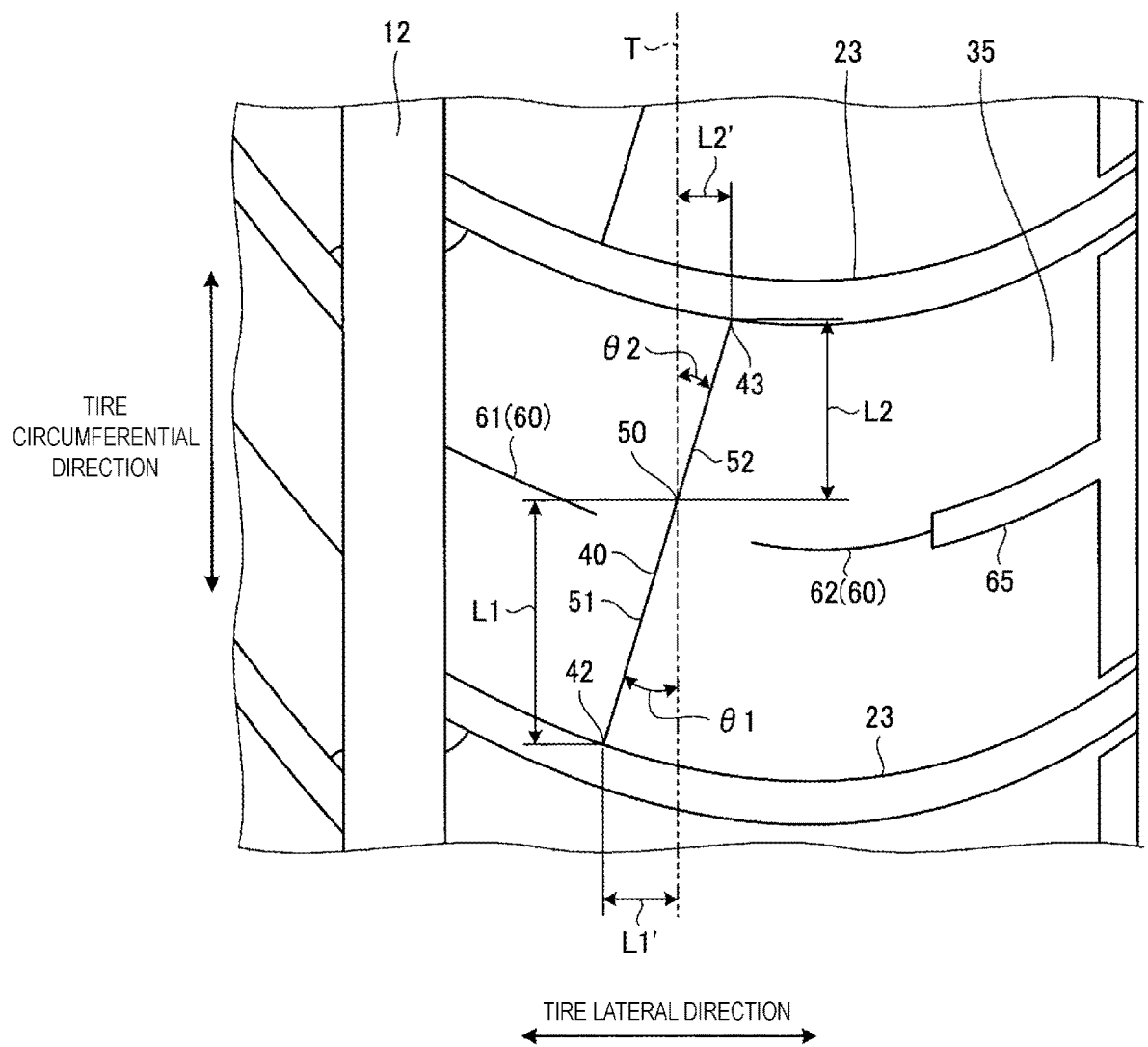
FIG. 6 is a detailed view of a main portion of FIG. 2 and an explanatory diagram of an arrangement position of a narrow groove.

FIG. 6 is a detailed view of the main portion of FIG. 2 and an explanatory diagram of the arrangement position of the narrow groove. In the narrow groove 40, the relationship L1≥L2 and the relationship 1≤(L1/L2)≤2 are satisfied, where L1 is a distance between an intersection portion 50 at which the narrow groove 40 and the ground contact edge T intersect with each other and the ground contact surface inner end portion 42 in the tire circumferential direction and L2 is a distance between the intersection portion 50 and the ground contact surface outer end portion 43 in the tire circumferential direction. That is, in the narrow groove 40, the distance L1 between the intersection portion 50 and the ground contact surface inner end portion 42 in the tire circumferential direction has a length equal to or larger than the distance L2 between the intersection portion 50 and the ground contact surface outer end portion 43 in the tire circumferential direction. The distance L1 between the intersection portion 50 and the ground contact surface inner end portion 42 in the tire circumferential direction has a length from one time to two times the distance L2 between the intersection portion 50 and the ground contact surface outer end portion 43 in the tire circumferential direction.

Further, in the narrow groove 40, the relationship L1'≥L2' and the relationship 1≤(L1'/L2')≤2 are satisfied, where L1' is a distance between the ground contact edge T and the ground contact surface inner end portion 42 in the tire width direction and L2' is a distance between the ground contact edge T and the ground contact surface outer end portion 43 in the tire width direction. That is, in the narrow groove 40, the distance L1' between the ground contact edge T and the ground contact surface inner end portion 42 in the tire width direction has a length equal to or larger than the distance L2' between the ground contact edge T and the ground contact surface outer end portion 43 in the tire width direction. The distance L1' between the ground contact edge T and the ground contact surface inner end portion 42 in the tire width direction has a length from one time to two times the distance L2' between the ground contact edge T and the ground contact surface outer end portion 43 in the tire width direction.

Further, in the narrow groove 40, the relationship 10°≤θ1≤45°, the relationship 10°≤θ2≤45°, and the relationship 0.8≤(θ1/θ2)≤2.0 are satisfied, where θ1 is an angle formed between a portion positioned inward in the tire width direction with respect to the ground contact edge T and the ground contact edge T and θ2 is an angle formed between a portion positioned outward in the tire width direction with respect to the ground contact edge T and the ground contact edge T. In this case, the angle θ1 is an angle formed between a ground contact inner straight line 51 and the ground contact edge T, and the angle θ2 is an angle formed between a ground contact outer straight line 52 and the ground contact edge T. The ground contact inner straight line 51 is a straight line connecting the intersection portion 50 and the ground contact surface inner end portion 42 with each other, and the ground contact outer straight line 52 is a straight line connecting the intersection portion 50 and the ground contact surface outer end portion 43 with each other.

That is, when the narrow groove 40 is linearly formed from the ground contact surface inner end portion 42 to the ground contact surface outer end portion 43, the ground contact inner straight line 51 and the ground contact outer straight line 52 match with the narrow groove 40. As described above, in the narrow groove 40, both the angle θ1 formed between the ground contact inner straight line 51 and the ground contact edge T and the angle θ2 formed between the ground contact outer straight line 52 and the ground contact edge T fall within a range from 10° to 45°. The angle θ1 formed between the ground contact inner straight line 51 and the ground contact edge T falls within a range from 0.8 times to twice of the angle θ2 formed between the ground contact outer straight line 52 and the ground contact edge T.

Note that, in the narrow groove 40, it is preferred that the angle θ1 formed between the ground contact inner straight line 51 and the ground contact edge T and the angle θ2 formed between the ground contact outer straight line 52 and the ground contact edge T fall within a range of 1.0≤(θ1/θ2)≤2.0.

Further, a divided narrow groove 60 is formed in the shoulder block 35. The divided narrow groove 60 is positioned near the center of the shoulder block 35 in the tire circumferential direction to extend in the tire width direction, and is subjected to division in the tire width direction. Specifically, the divided narrow groove 60 is divided in the tire width direction near the position in the tire width direction where the narrow groove 40 is formed, and has an inner divided narrow groove 61 positioned inward in the tire width direction of the narrow groove 40 and an outer divided narrow groove 62 positioned outward in the tire width direction of the narrow groove 40. Of these, the inner divided narrow groove 61 has an inner end portion in the tire width direction which is connected to the outermost main groove 12 and an outer end portion in the tire width direction which is terminated in the shoulder block 35. Further, the outer divided narrow groove 62 has an outer end portion in the tire width direction which is connected to an out-of-ground-contact-surface lug groove 65 positioned outward in the tire width direction with respect to the ground contact edge T, and an inner end portion in the tire width direction, which is terminated in the shoulder block 35.

When such a pneumatic tire 1 is mounted on a vehicle and the vehicle is driven, the pneumatic tire 1 rotates while the tread surface 3 of the tread surface 3 positioned at the bottom comes into contact with the road surface. When the vehicle to which the pneumatic tire 1 is mounted travels on the dry road surface, traveling is performed mainly by a friction force between the tread surface 3 and the road surface, which causes a driving force or a braking force to be transmitted to the road surface and a turning force to be generated. Further, when the vehicle travels on the wet road surface, water between the tread surface 3 and the road surface enters the main grooves 10 or the lug grooves 20. The vehicle travels while the water between the tread surface 3 and the road surface is drained through these grooves. Thus, the tread surface 3 is more likely to come into contact with the road surface, and the vehicle can travel because of the friction force between the tread surface 3 and the road surface.

In the tread surface 3 of the pneumatic tire 1, the plurality of main grooves 10 and the plurality of lug grooves 20 are formed in order to secure the drainage properties on the wet road surface as described above. However, these grooves degrade the rigidity of the portions in the land portions 30 at or near the portions in which the main grooves 10 and the lug grooves 20 are formed. Thus, when the land portions 30 come into contact with the road surface during the vehicle traveling, the portions of the land portions 30 at or near the main grooves 10 and the lug grooves 20 are liable to be deformed with a load received from the road surface. Particularly, the shoulder blocks 35 are liable to receive a large load when the vehicle turns.

Meanwhile, in the shoulder lug grooves 23 defining the shoulder blocks 35, the raised bottom portions 26 are formed in an area between the end portions 24 on the side connected to the outermost main grooves 12 and the ground contact edge T. Thus, in the portions of the shoulder blocks 35, which are adjacent to the shoulder lug grooves 23, the rigidity is secured in the portions positioned in the areas where the raised bottom portions 26 are formed. That is, the raised bottom portions 26 have the groove depth smaller than that of the portions where the raised bottom portions 26 are not formed in the shoulder lug grooves 23, and hence the block rigidity is secured in the shoulder blocks 35. Even when the load is acted on the shoulder blocks 35, the shoulder blocks 35 are less liable to collapse. Therefore, even when, for example, the large load is acted on the shoulder blocks 35 during the vehicle turning, the shoulder blocks 35 in which the block rigidity is secured can receive the load without being largely deformed. Thus, the steering stability can be secured.

Further, in the shoulder blocks 35, the narrow grooves 40 are formed between the shoulder lug grooves 23 that are adjacent to each other, that is, between the shoulder lug grooves 23 defining the shoulder blocks 35. Thus, the block rigidity in the shoulder blocks 35 can be made uniform. That is, in the shoulder blocks 35, the block rigidity is more liable to be high in the central regions as compared to the portions adjacent to the shoulder lug grooves 23 and the outermost main grooves 12. However, through providing the narrow grooves 40, the block rigidity in the central regions of the shoulder blocks 35 can be lowered. With this, the block rigidity difference in the shoulder blocks 35 can be reduced. Thus, the degradation of the steering stability caused by the block rigidity difference can be suppressed, and the steering stability can be secured.

Further, in the narrow groove 40, the relationship $W \geq (D1 \times 0.8)$ is satisfied between the distance W between the ground contact surface inner end portion 42 and the outermost main groove 12 in the tire width direction and the groove depth D1 of the outermost main groove 12. Thus, the block rigidity difference in the shoulder blocks 35 can be reduced more reliably. That is, when the relationship $W < (D1 \times 0.8)$ is satisfied, intervals between the narrow grooves 40 and the outermost main grooves 12 in the shoulder blocks 35 are too small, and hence, the block rigidity in these portions are lowered. As a result, the block rigidity difference in the shoulder blocks 35 cannot be reduced. However, when the relationship $W \geq (D1 \times 0.8)$ is satisfied, the block rigidity between the narrow grooves 40 and the outermost main grooves 12 in the shoulder blocks 35 can be secured. Thus, the block rigidity difference in the shoulder blocks 35 can be reduced, and the steering stability can be secured.

Further, during traveling on the wet road surface, the water between the tread surface 3 and the road surface enters, for example, the main grooves 10, and flows through the lug grooves 20. Then, the water flows through the other main grooves 10 and the shoulder lug grooves 23. In this manner, the water is discharged outside in the tire width direction with respect to the ground contact edge T. In such a case, the raised bottom portions 26 are formed in the shoulder lug grooves 23, and hence the portions in which the raised bottom portion 26 are formed have small volumes. Thus, the water amount which flow through the single shoulder lug groove 23 from the end portion 24 on the outermost main groove 12 side to the ground contact edge T side is small.

Meanwhile, in the shoulder lug groove 23, the narrow groove 40 is formed in a space between the position in which the raised bottom portion 26 is formed and the position in which the raised bottom portion 26 is not formed in the shoulder lug grooves 23 that are adjacent to each other. Thus, when the water flows in the shoulder lug grooves 23 from the outermost main grooves 12, part of the water flows from the ground contact surface inner end portions 42 of the narrow grooves 40 to the narrow grooves 40, and flows from the narrow grooves 40 to the shoulder lug grooves 23 connected to the ground contact surface outer end portions 43.

That is, when the water flows from the outermost main grooves 12 to the positions where the raised bottom portions 26 are formed in the shoulder lug grooves 23, part of the water passes through the shoulder lug grooves 23, flows outward in the tire width direction with respect to the ground contact edge T, and then flows to the positions where the raised bottom portions 26 are not formed. Further, the other part of the water at the position where the raised bottom portion 26 is formed in the shoulder lug groove 23 flows through the narrow groove 40 to the position where the raised bottom portion 26 is not formed in the shoulder lug groove 23 that is adjacent to the previous shoulder lug groove 23. The groove depth at the position where the raised bottom portion 26 is not formed in the shoulder lug groove 23 is relatively large, and the groove volume thereof is relatively large. Thus, any part of the water at the position where the raised bottom portion 26 is not formed easily flows through the shoulder lug groove 23. Thus, the water flowing into the position where the raised bottom portion 26 is not formed in the shoulder lug groove 23 passes through the shoulder lug groove 23, and flows outward in the tire width direction with respect to the ground contact edge T.

In this manner, the shoulder lug grooves 23 can cause the water entering the outermost main grooves 12 to flow outward in the tire width direction with respect to the ground contact edge T, and can cause the water between the tread surface 3 and the road surface to be drained outside the ground contact region of the tread surface 3. Thus, when traveling on a wet road surface, the friction force between the tread surface 3 and the road surface can be secured, and the wet performance can be secured. As a result, the steering stability and the wet performance can be provided in a compatible manner.

Further, in the shoulder lug groove 23, the groove depth D2 at the position where the raised bottom portion 26 is formed is formed within a range of $(D1\times0.2) \leq D2 \leq (D1\times0.8)$ with respect to the groove depth D1 of the outermost main groove 12. Thus, the water flowability in the shoulder lug grooves 23 and the block rigidity in the shoulder blocks 35 can be provided in a compatible manner more reliably. That is, when the relationship $D2<(D1\times0.2)$ is satisfied, the groove depth D2 at the position where the raised bottom portion 26 is formed is too small. Thus, the water does not easily flow through the shoulder lug grooves 23, and the wet performance may be difficult to be effectively secured. Further, when the relationship $D2>(D1\times0.8)$ is satisfied, the bottom is insufficiently raised at the raised bottom portion 26. Thus, even when the raised bottom portion 26 is provided in the shoulder lug groove 23, the block rigidity in the shoulder blocks 35 may be difficult to be effectively secured. However, when the groove depth D2 at the position where the raised bottom portion 26 is formed in the shoulder lug groove 23 falls within a range of $(D1\times0.2) \leq D2 \leq (D1\times0.8)$ with respect to the groove depth D1 of the outermost main groove 12, the water flowability can be secured more reliably in the shoulder lug grooves 23, and the block rigidity in the shoulder blocks 35 can be secured. As a result, the steering stability and the wet performance can be provided more reliably in a compatible manner.

Further, in the shoulder lug groove 23, the groove depth D3 at the position where the raised bottom portion 26 is not formed is smaller than the groove depth D1 of the outermost main groove 12, and hence the block rigidity in the shoulder blocks 35 can be secured more reliably. As a result, when the shoulder lug grooves 23 are provided to secure the wet performance, the steering stability can be secured more reliably.

Further, in the narrow groove 40, the groove depth S1 of the ground contact surface inner end portion 42 is formed in a range of $(D2\times0.2) \leq S1 \leq D2$ with respect to the groove depth D2 at the position where the raised bottom portion 26 is formed in the shoulder lug groove 23. Thus, the water flowability in the shoulder lug grooves 23 and the narrow grooves 40 and the block rigidity in the shoulder blocks 35 can be provided in a compatible manner more reliably. That is, when the relationship $S1<(D2\times0.2)$ is satisfied, the groove depth S1 of the ground contact surface inner end portion 42 is too small. Thus, the water does not easily flow from the shoulder lug grooves 23 to the narrow grooves 40, and hence the water flowability in the shoulder lug grooves 23 may be difficult to be secured. Further, when the relationship $S1>D2$ is satisfied, the groove depth S1 of the ground contact surface inner end portion 42 is too large. Thus, although the raised bottom portions 26 are provided in the shoulder lug grooves 23, the block rigidity in the shoulder blocks 35 may be difficult to be effectively secured. However, when the groove depth S1 of the ground contact surface inner end portion 42 falls within a range of $(D2\times0.2) \leq S1 \leq D2$ with respect to the groove depth D2 at the position where the raised bottom portion 26 is formed in the shoulder lug groove 23, the water flowability in the shoulder lug grooves 23 and the narrow grooves 40 can be secured more reliably, and the block rigidity in the shoulder blocks 35 can be secured. As a result, the steering stability and the wet performance can be provided more reliably in a compatible manner.

Further, in the narrow groove 40, the groove depth S2 of the ground contact surface outer end portion 43 is formed within a range of $D2 \leq S2 \leq D3$ with respect to the groove depth D2 at the position where the raised bottom portion 26 is formed in the shoulder lug groove 23 and the groove depth D3 at the position where the raised bottom portion 26 is not formed. Thus, the water flowability in the shoulder lug grooves 23 and the narrow grooves 40 and the block rigidity in the shoulder blocks 35 can be provided in a compatible manner more reliably. That is, when the relationship $S2<D2$ is satisfied, the groove depth S2 of the ground contact surface outer end portion 43 is too small. Thus, the water does not easily flow from the shoulder lug grooves 23 to the narrow grooves 40, and hence the water flowability in the shoulder lug grooves 23 may be difficult to be secured. Further, when the relationship $S2>D3$ is satisfied, the groove depth S2 of the ground contact surface outer end portion 43 is too large. Thus, the block rigidity in the shoulder blocks 35 may be degraded. However, when the groove depth S2 of the ground contact surface outer end portion 43 falls within a range of $D2 \leq S2 \leq D3$ with respect to the groove depth D2 at the position where the raised bottom portion 26 is formed in the shoulder lug groove 23 and the groove depth D3 at the position where the raised bottom portion 26 is not formed, the water flowability in the shoulder lug grooves 23 and the narrow grooves 40 can be secured more reliably, and the block rigidity in the shoulder blocks 35 can be secured. As a result, the steering stability and the wet performance can be provided more reliably in a compatible manner.

Further, in the narrow groove 40, the distance L1 between the intersection portion 50 and the ground contact surface inner end portion 42 in the tire circumferential direction is equal to or larger than the distance L2 between the intersection portion 50 and the ground contact surface outer end portion 43 in the tire circumferential direction. Thus, an area of the narrow groove 40 positioned inward in the tire width direction with respect to the ground contact edge T can be secured. With this structure, the water flowing into the portions in which the raised bottom portions 26 are formed in the shoulder lug grooves 23 can be caused to flow to the narrow grooves 40 more reliably. As a result, when the raised bottom portions 26 are provided in the shoulder lug grooves 23 to secure the steering stability, the wet performance can be secured more reliably.

Further, in the narrow groove 40, the distance L1 between the intersection portion 50 and the ground contact surface inner end portion 42 in the tire circumferential direction and the distance L2 between the intersection portion 50 and the ground contact surface outer end portion 43 in the tire circumferential direction are formed within a range of $1 \leq (L1/L2) \leq 2$. Thus, the water flowability in the shoulder lug grooves 23 and the narrow grooves 40 and the block rigidity in the shoulder blocks 35 can be provided in a compatible manner more reliably. That is, when the relationship $(L1/L2)<1$ is satisfied, the area of the narrow groove 40 inward in the tire width direction with respect to the ground contact edge T is small, and the length of the portion of the narrow groove 40 positioned inward in the tire width direction with respect to the ground contact edge T is too small. Thus, the water flowing into the portions in which the raise bottom portions 26 are formed in the shoulder lug grooves 23 may not easily flow in the narrow grooves 40. Further, when the relationship $(L1/L2)>2$ is satisfied, the area of the narrow groove 40 inward in the tire width direction with respect to the ground contact edge T is large, and the length of the portion of the narrow groove 40 positioned inward in the tire width direction with respect to the ground contact edge T is too large. Thus, it may be difficult to secure the block rigidity in the portions in the shoulder blocks 35 positioned inward in the tire width direction with respect to the ground contact edge T. However, in the narrow groove 40, when the distance L1 between the intersection portion 50 and the ground contact surface inner end portion 42 in the tire circumferential direction and the distance L2 between the intersection portion 50 and the ground contact surface outer end portion 43 in the tire circumferential direction fall within a range of $1 \leq (L1/L2) \leq 2$, the water flowability in the shoulder lug grooves 23 and the narrow grooves 40 can be secured more reliably, and the block rigidity in the shoulder blocks 35 can be secured. As a result, the steering stability and the wet performance can be provided more reliably in a compatible manner.

Further, in the narrow groove 40, the distance L1' between the ground contact edge T and the ground contact surface inner end portion 42 in the tire width direction is equal to or larger than the distance L2' between the ground contact edge T and the ground contact surface outer end portion 43 in the tire width direction. Thus, the area of the narrow groove 40 positioned inward in the tire width direction with respect to the ground contact edge T can be secured. With this structure, the water flowing into the portions in which the raised bottom portions 26 are formed in the shoulder lug grooves 23 can be caused to flow to the narrow grooves 40 more reliably. As a result, when the raised bottom portions 26 are provided in the shoulder lug grooves 23 to secure the steering stability, the wet performance can be secured more reliably.

Further, in the narrow groove 40, the distance L1' between the ground contact edge T and the ground contact surface inner end portion 42 in the tire width direction and the distance L2' between the ground contact edge T and the ground contact surface outer end portion 43 in the tire width direction are formed within a range of $1 \leq (L1'/L2') \leq 2$. Thus, the water flowability in the shoulder lug grooves 23 and the narrow grooves 40 and the block rigidity in the shoulder blocks 35 can be provided in a compatible manner more reliably. That is, when the relationship $(L1'/L2')<1$ is satisfied, the area of the narrow groove 40 positioned inward in the tire width direction with respect to the ground contact edge T is small, and the length of the portion of the narrow groove 40 positioned inward in the tire width direction with respect to the ground contact edge T is too small. Thus, the water flowing into the portions in which the raise bottom portions 26 are formed in the shoulder lug grooves 23 may not easily flow in the narrow grooves 40. Further, when the relationship $(L1'/L2')>2$ is satisfied, the area of the narrow groove 40 positioned inward in the tire width direction with respect to the ground contact edge T is large, and the length of the portion of the narrow groove 40 positioned inward in the tire width direction with respect to the ground contact edge T is too large. Thus, it may be difficult to secure the block rigidity in the portions in the shoulder blocks 35 positioned inward in the tire width direction with respect to the ground contact edge T. However, in the narrow groove 40, when the distance L1' between the ground contact edge T and the ground contact surface inner end portion 42 in the tire width direction and the distance L2' between the ground contact edge T and the ground contact surface outer end portion 43 in the tire width direction fall within a range of $1 \leq (L1'/L2') \leq 2$, the water flowability in the shoulder lug grooves 23 and the narrow grooves 40 can be secured more reliably, and the block rigidity in the shoulder blocks 35 can be secured. As a result, the steering stability and the wet performance can be provided more reliably in a compatible manner.

Further, in the narrow groove 40, the angle θ1 formed between the ground contact inner straight line 51 and the ground contact edge T and the angle θ2 formed between the ground contact outer straight line 52 and the ground contact edge T fall within a range of $10° \leq θ1 \leq 45°$ and $10° \leq θ2 \leq 45°$, respectively. Thus, the drainage properties achieved by providing the narrow grooves 40 can be secured more reliably, and the block rigidity in the shoulder blocks 35 can be secured more reliably. That is, when the relationship $θ1<10°$ or the relationship $θ2<10°$ is satisfied, it is difficult to arrange the narrow groove 40 in the space between the position where the raised bottom portion 26 is formed and the position where the raised bottom portion 26 is not formed in the shoulder lug grooves 23 that are adjacent to each other. Further, when the relationship $θ1>45°$ or the relationship $θ2>45°$ is satisfied, an angle of the portion at which the narrow groove 40 and the shoulder lug groove 23 are connected to each other is small. Thus, the block rigidity of such portions in the shoulder blocks 35 may be difficult to be secured. However, in the narrow groove 40, when the angle θ1 formed between the ground contact inner straight line 51 and the ground contact edge T and the angle θ2 formed between the ground contact outer straight line 52 and the ground contact edge T fall within a range of $10° \leq θ1 \leq 45°$ and $10° \leq θ2 \leq 45°$, respectively, the drainage properties can be secured by forming the narrow groove 40 in the space between the position where the raised bottom portion 26 is formed and the position where the raised bottom portion 26 is not formed in the shoulder lug grooves 23 that are adjacent to each other. Further, the block rigidity in the shoulder blocks 35 can be secured. As a result, the steering stability and the wet performance can be provided more reliably in a compatible manner.

Further, in the narrow groove 40, the angle θ1 formed between the ground contact inner straight line 51 and the ground contact edge T and the angle θ2 formed between the ground contact outer straight line 52 and the ground contact edge T fall within a range of $0.8 \leq (θ1/θ2) \leq 2.0$. Thus, the drainage properties achieved by providing the narrow grooves 40 can be secured more reliably, and the block rigidity in the shoulder blocks 35 can be secured more reliably. That is, when the relationship $(θ1/θ2)<0.8$ is satisfied, the area of the narrow groove 40 positioned inward in the tire width direction with respect to the ground contact edge T is small, and the length of the portion of the narrow groove 40 positioned inward in the tire width direction with respect to the ground contact edge T is too small. Thus, the water flowing into the positions in which the raise bottom portions 26 are formed in the shoulder lug grooves 23 may not easily flow in the narrow grooves 40. Further, when the relationship $(θ1/θ2)>2.0$ is satisfied, the length of the portion of the narrow groove 40 positioned inward in the tire width direction with respect to the ground contact edge T is too large. Thus, the block rigidity in the shoulder blocks 35 may be difficult to be secured. However, in the narrow groove 40, when the angle θ1 formed between the ground contact inner straight line 51 and the ground contact edge T and the angle θ2 formed between the ground contact outer straight line 52 and the ground contact edge T fall within a range of $0.8 \leq (θ1/θ2) \leq 2.0$, the water flowability from the portions in which the raised bottom portions 26 are formed in the shoulder lug grooves 23 to the narrow grooves 40 can be secured, and the block rigidity in the shoulder blocks 35 can be secured. As a result, the steering stability and the wet performance can be provided more reliably in a compatible manner.

Further, in the shoulder blocks 35, the divided narrow grooves 60 are formed. Thus, not only with the narrow grooves 40 but also with the divided narrow grooves 60, the block rigidity in the shoulder blocks 35 can be made uniform. That is, the shoulder block 35 have both the ends in the tire circumferential direction, which are defined by the shoulder lug grooves 23. Thus, the block rigidity is liable to be lowered near both the end portions in the tire circumferential direction as compared to the vicinity of the center in the tire circumferential direction. However, in the pneumatic tire 1 according to the present embodiment, the divided narrow groove 60 is formed at or near the center of the shoulder block 35 in the circumferential direction. With this, for the position of each shoulder blocks 35 in the tire circumferential direction, the block rigidity can be made uniform. Further, when the divided narrow grooves 60 are provided, the drainage properties in the region outward in the tire width direction with respect to the outermost main grooves 12 can be further improved. As a result, the steering stability and the wet performance can be provided more reliably in a compatible manner.

Figure 7:
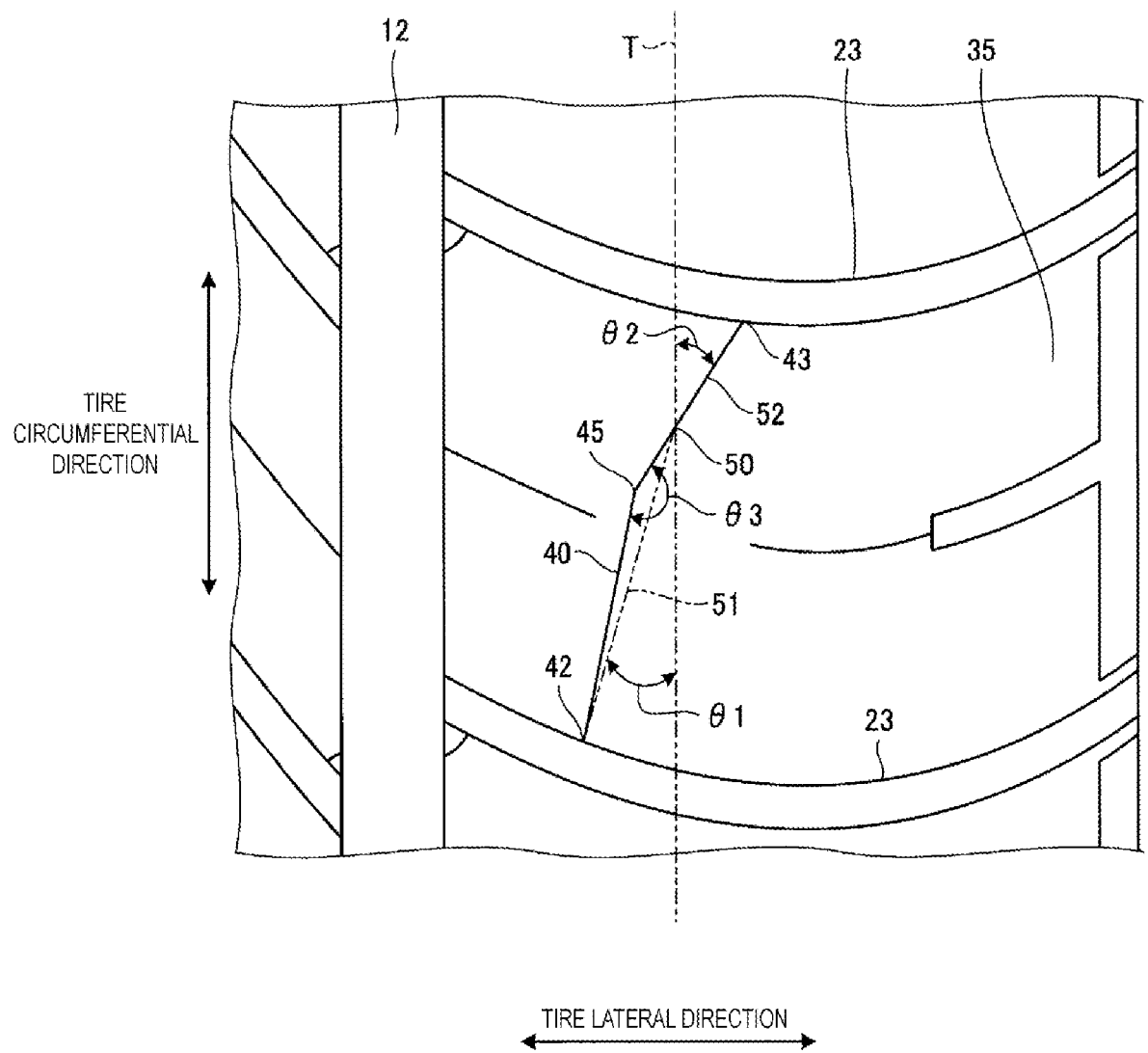
FIG. 7 is a view of a modified example of a pneumatic tire according to an embodiment and an explanatory diagram of a configuration in which the narrow groove is bent.

Note that, in the pneumatic tire 1 according to the above-mentioned embodiment, the narrow grooves 40 are linearly formed, but the narrow grooves 40 may be formed into shapes other than the linear shape. FIG. 7 is a view of a modified example of the pneumatic tire according to the embodiment and an explanatory diagram of a configuration in which the narrow groove is bent. As illustrated in, for example, FIG. 7, the narrow grooves 40 may be formed to be bent. When the narrow groove 40 is formed to be bent, a minor angle $\theta 3$ of a bent portion 45, which is a bent portion, is too small, the water flowability in the narrow groove 40 is degraded, and hence the wet performance is difficult to be secured. Thus, it is preferred that the angle $\theta 3$ of the bent portion 45 be equal to or greater than 135°. Further, the bent portion 45 and the intersection portion 50 may match with each other, or may not match with each other. When the bent portion 45 and the intersection portion 50 do not match with each other, it is only required that the following matters be satisfied. That is, in the narrow groove 40, the ground contact inner straight line 51 indicates the straight line connecting the intersection portion 50 and the ground contact surface inner end portion 42, and the ground contact outer straight line 52 indicates the straight line connecting the intersection portion 50 and the ground contact surface outer end portion 43. The angle $\theta 1$ formed between the ground contact edge T and the ground contact inner straight line 51 and the angle $\theta 2$ formed between the ground contact edge T and the ground contact outer straight line 52 satisfy the relationship $10° \leq \theta 1 \leq 45°$, the relationship $10° \leq \theta 2 \leq 45°$, and the relationship $0.8 \leq (\theta 1/\theta 2) \leq 2.0$.

Figure 8:
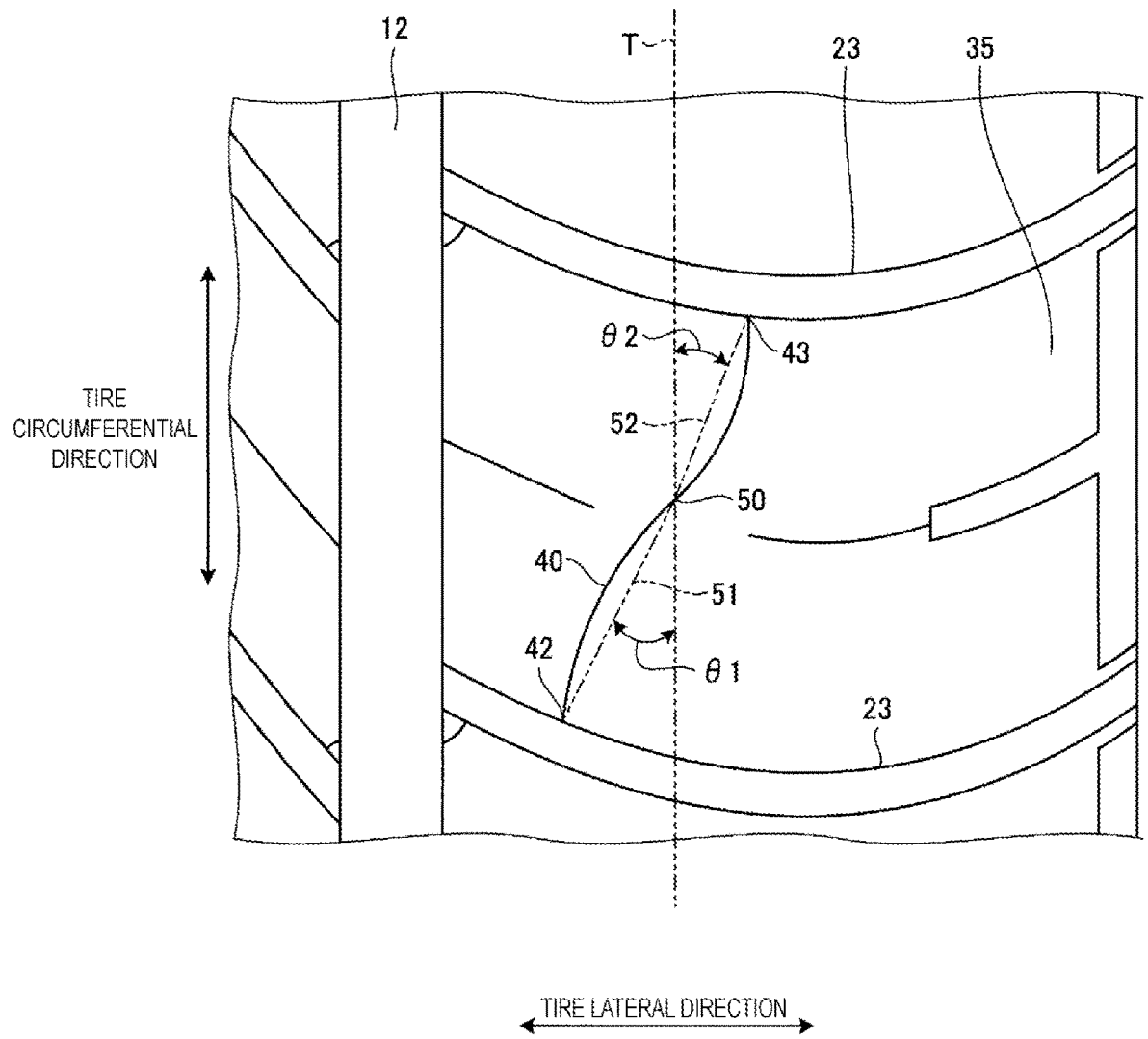
FIG. 8 is a view of a modified example of a pneumatic tire according to an embodiment and an explanatory diagram of a configuration in which the narrow groove is curved.

FIG. 8 is a modified example of the pneumatic tire according to the embodiment and an explanatory diagram of a configuration in which the narrow groove is curved. Further, as illustrated in FIG. 8, the narrow groove 40 may be formed to have a curved shape, and may be curved between the ground contact surface inner end portion 42 and the ground contact surface outer end portion 43. When the narrow groove 40 is curved as described above, it is only required that the following matters be satisfied. That is, the ground contact inner straight line 51 indicates the straight line connecting the intersection portion 50 and the ground contact surface inner end portion 42, and the ground contact outer straight line 52 indicates the straight line connecting the intersection portion 50 and the ground contact surface outer end portion 43. A relationship $10° \leq \theta 1 \leq 45°$, a relationship $10° \leq \theta 2 \leq 45°$, and a relationship $0.8 \leq (\theta 1/\theta 2) \leq 2.0$ are satisfied.

Examples

FIG. 9A to FIG. 9C are tables showing results of performance tests of pneumatic tires. In relation to the pneumatic tire 1 described above, performance evaluation tests conducted on a pneumatic tire according to a Conventional Example and pneumatic tires 1 according to embodiments of the present technology are described below. The performance evaluation tests were conducted on the wet performance being driving performance on the wet road surface and the steering stability on the dry road.

In the performance evaluation tests, the pneumatic tires 1 having a nominal size of 195/65R15 91H specified by JATMA were mounted on rim wheels of a JATMA standard rim having a size of 15×6.0 J, and air pressure was adjusted to 230 kPa. The tires were mounted on a front-wheel-drive test vehicle of an engine displacement of 1800 cc, and the vehicle was used for the test runs. As for an evaluation method for each test item, the wet performance was evaluated in the following manner. That is, a distance from the time when braking was started at the initial velocity of 100 km/h to the time of stop was measured on a wet road surface with a water film having a thickness of 1 mm. Then, reciprocals of the measurement values were subjected to indexation, and the evaluations were performed. The results for wet performance are expressed as index values with the value of the Conventional Example described later being defined as 100. Larger values indicate superior wet performance. Further, as for the steering stability, a test driver drove the vehicle, which was used for the evaluation tests and mounted with the pneumatic tires 1, and sensory evaluations were performed by the test driver. The results for steering stability are expressed as the evaluation score with the value of the Conventional Example described later being defined as 100. Larger evaluation scores indicate superior steering stability.

The evaluation tests were performed on eighteen types of pneumatic tires, that is, the pneumatic tire according to the Conventional Example being an example of the related-art pneumatic tire 1, the pneumatic tires 1 according to embodiments of the present technology in Examples 1 to 15, and the pneumatic tires in Comparative Examples 1 and 2 for comparison with the pneumatic tires 1 according to embodiments of the present technology. In the pneumatic tire in the Conventional Example of these pneumatic tires 1, the raised bottom portions 26 were not provided in the shoulder lug grooves 23. Further, in the pneumatic tires in Comparative Examples 1 and 2, the raised bottom portions 26 were provided in the shoulder lug grooves 23. However, the narrow grooves 40 across the ground contact edges T were not provided in the shoulder blocks 35, or the end portions 41 of the narrow grooves 40 were too close to the outermost main grooves 12.

However, in all of Examples 1 to 15 being examples of the pneumatic tires 1 according to embodiments of the present technology, the following structure was employed. That is, the raised bottom portions 26 were provided in the shoulder lug grooves 23. The narrow grooves 40 across the ground contact edges T were provided in the shoulder blocks 35. The distance W from the outermost main groove 12 to the end portion 41 of the narrow groove 40 in the tire width direction is 0.8 times of the groove depth D1 of the outermost main groove 12 or larger. Further, the pneumatic tires 1 in Examples 1 to 15 differed in the following points: the ratio of the groove depth D2 at the position where the raised bottom portion 26 was formed and the groove depth D3 at the position where the raised bottom portion 26 was not formed in the shoulder block 35; the ratio of the groove depth of the narrow groove 40 to the groove depth of the shoulder block 35; an arrangement mode of the narrow groove 40 on both the sides of the ground contact edge T; and presence or absence of the divided narrow groove 60.

As the results of the evaluation tests conducted by using these pneumatic tires 1, as shown in FIG. 9A to FIG. 9C, the following matters can be understood. That is, in the pneumatic tires 1 in Examples 1 to 15, both the steering stability and the wet performance are not degraded, and at least one of the steering stability and the wet performance can be improved as compared to the Conventional Example and Comparative Examples 1 and 2. That is, the pneumatic tire 1 according to Examples 1 to 15 can provide the steering stability and the wet performance in a compatible manner.

The invention claimed is:

1. A pneumatic tire, comprising:
a plurality of main grooves, which are formed in a tread surface and extend in a tire circumferential direction;
a plurality of shoulder lug grooves, which are positioned outward in a tire width direction with respect to outermost main grooves of the plurality of main grooves in the tire width direction, are formed to extend in the tire width direction across ground contact edges, and have inner end portions in the tire width direction connected to the outermost main grooves; and
narrow grooves, which are positioned outward in the tire width direction with respect to the outermost main grooves, are formed in spaces between the plurality of shoulder lug grooves that are adjacent to each other in the tire circumferential direction, and are connected to the plurality of shoulder lug grooves, wherein
the plurality of shoulder lug grooves include raised bottom portions, which are formed by reducing a groove depth in areas between end portions on sides connected to the outermost main grooves and the ground contact edges,
the narrow grooves have inner ends positioned inward in the tire width direction with respect to the ground contact edges and outer ends positioned outward in the tire width direction with respect to the ground contact edges, and are formed across the ground contact edges,
the inner ends are connected to positions where the raised bottom portions are formed in the plurality of shoulder lug grooves,
the outer ends are connected to positions where the raised bottom portions are not formed in the plurality of shoulder lug grooves, and
a relationship of $W \geq (D1 \times 0.8)$ is satisfied, where W indicates a distance between the inner ends and the outermost main grooves in the tire width direction and D1 indicates a groove depth of the outermost main grooves.

2. The pneumatic tire according to claim 1, wherein, in the plurality of shoulder lug grooves, a relationship $(D1 \times 0.2) \leq D2 < (D1 \times 0.8)$, a relationship $D2 < D3$, and a relationship $D3 < D1$ are satisfied, where D2 indicates a groove depth at the positions where the raised bottom portions are formed, D3 indicates a groove depth at the positions where the raised bottom portions are not formed, and D1 indicates the groove depth of the outermost main grooves.

3. The pneumatic tire according to claim 1, wherein, in the narrow grooves, a relationship $(D2 \times 0.2) \leq S1 \leq D2$ and a relationship $D2 \leq S2 \leq D3$ are satisfied, where S1 indicates a groove depth of the inner ends, S2 indicates a groove depth of the outer ends, D2 indicates the groove depth of the positions where the raised bottom portions are formed in the plurality of shoulder lug grooves, and D3 indicates a groove depth at the positions where the raised bottom portions are not formed.

4. The pneumatic tire according to claim 1, wherein, in the narrow grooves, a relationship $L1 \geq L2$ and a relationship $1 \leq (L1/L2) \leq 2$ are satisfied, where L1 indicates a distance between intersection portions at which the narrow grooves and the ground contact edges intersect with each other and the inner ends in the tire circumferential direction and L2 indicates a distance between the intersection portions and the outer ends in the tire circumferential direction.

5. The pneumatic tire according to claim 1, wherein, in the narrow grooves, a relationship $L1' \geq L2'$ and a relationship $1 \leq (L1'/L2') \leq 2$ are satisfied, where L1' indicates a distance between the ground contact edges and the inner ends in the tire width direction and L2' indicates a distance between the ground contact edges and the outer ends in the tire width direction.

6. The pneumatic tire according to claim 1, wherein, in the narrow grooves, a relationship $10° \leq \theta1 \leq 45°$, a relationship $10° \leq \theta2 \leq 45°$, and a relationship $0.8 \leq (\theta1/\theta2) \leq 2.0$ are satisfied, where $\theta1$ indicates an angle formed between straight lines connecting intersection portions at which the narrow grooves and the ground contact edges intersect with each other and the inner ends and $\theta2$ indicates an angle formed by straight lines connecting the intersection portions and the outer ends and the ground contact edges.

7. The pneumatic tire according to claim 2, wherein, in the narrow grooves, a relationship $(D2 \times 0.2) \leq S1 \leq D2$ and a relationship $D2 \leq S2 \leq D3$ are satisfied, where S1 indicates a groove depth of the inner ends, S2 indicates a groove depth of the outer ends, D2 indicates the groove depth of the positions where the raised bottom portions are formed in the plurality of shoulder lug grooves, and D3 indicates a groove depth at the positions where the raised bottom portions are not formed.

8. The pneumatic tire according to claim 7, wherein, in the narrow grooves, a relationship $L1 \geq L2$ and a relationship $1 \leq (L1/L2) \leq 2$ are satisfied, where L1 indicates a distance between intersection portions at which the narrow grooves and the ground contact edges intersect with each other and the inner ends in the tire circumferential direction and L2 indicates a distance between the intersection portions and the outer ends in the tire circumferential direction.

9. The pneumatic tire according to claim 8, wherein, in the narrow grooves, a relationship $L1' \geq L2'$ and a relationship $1 \leq (L1'/L2') \leq 2$ are satisfied, where L1' indicates a distance between the ground contact edges and the inner ends in the tire width direction and L2' indicates a distance between the ground contact edges and the outer ends in the tire width direction.

10. The pneumatic tire according to claim 9, wherein, in the narrow grooves, a relationship $10° \leq \theta1 \leq 45°$, a relationship $10° \leq \theta2 \leq 45°$, and a relationship $0.8 \leq (\theta1/\theta2) \leq 2.0$ are satisfied, where $\theta1$ indicates an angle formed between straight lines connecting the intersection portions at which the narrow grooves and the ground contact edges intersect with each other and the inner ends and $\theta2$ indicates an angle formed by straight lines connecting the intersection portions and the outer ends and the ground contact edges.

* * * * *